US009185609B2

(12) United States Patent
Li

(10) Patent No.: US 9,185,609 B2
(45) Date of Patent: Nov. 10, 2015

(54) HANDOVER CONTROL SYSTEM AND HANDOVER CONTROL METHOD FOR FEMTOCELLS

(71) Applicant: HON HAI PRECISION INDUSTRY CO., LTD., New Taipei (TW)

(72) Inventor: Chih-Ming Li, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 96 days.

(21) Appl. No.: 13/972,928

(22) Filed: Aug. 22, 2013

(65) Prior Publication Data
US 2014/0113632 A1   Apr. 24, 2014

(30) Foreign Application Priority Data
Oct. 22, 2012  (TW) ............................... 101138964 A

(51) Int. Cl.
*H04W 36/30* (2009.01)
*H04W 36/18* (2009.01)
*H04W 36/14* (2009.01)
*H04W 36/12* (2009.01)
*H04W 36/08* (2009.01)
*H04W 36/00* (2009.01)
*H04W 36/04* (2009.01)
*H04W 84/04* (2009.01)

(52) U.S. Cl.
CPC .......... *H04W 36/0061* (2013.01); *H04W 36/04* (2013.01); *H04W 84/045* (2013.01)

(58) Field of Classification Search
CPC . H04W 36/0022; H04W 88/06; H04W 88/08; H04W 36/30; H04W 36/0016; H04W 36/22; H04W 40/36; H04W 76/026; H04W 12/06; H04W 28/20; H04W 64/00; H04W 64/003

USPC ......... 455/436, 437, 438, 439, 444, 446, 561, 455/440, 411, 452.2; 370/254, 338, 331, 370/332, 333, 334
See application file for complete search history.

(56) References Cited

U.S. PATENT DOCUMENTS

| | | | |
|---|---|---|---|
| 8,750,880 B2 * | 6/2014 | Matsuo et al. ................. | 455/438 |
| 8,792,892 B2 * | 7/2014 | Wu ................................ | 455/437 |
| 2010/0267386 A1 * | 10/2010 | Lim et al. ....................... | 455/436 |
| 2011/0002239 A1 * | 1/2011 | Venkatachalam .............. | 370/254 |
| 2011/0244870 A1 * | 10/2011 | Lee ................................ | 455/444 |
| 2013/0303170 A1 * | 11/2013 | Siomina et al. ............... | 455/436 |

FOREIGN PATENT DOCUMENTS

WO  WO 2012098411 A1 *  7/2012

* cited by examiner

*Primary Examiner* — Kashif Siddiqui
*Assistant Examiner* — Obidon Bassinan
(74) *Attorney, Agent, or Firm* — Novak Druce Connolly Bove + Quigg LLP

(57) ABSTRACT

A handover control method includes the follow steps. First, determining a geographical location of each femtocell and determining a maximum bandwidth provided by each femtocell, and determining which femtocells are in a same region according to the geographical information of each femtocell. Secondly, selecting one or more femtocells from one region as server femtocells of the region by comparing the maximum bandwidth of the femtocells in the same region, and transmitting identification information of each server femtocell to non-server femtocells near the server femtocell. Thirdly, transmitting registration information of all other femtocells of all regions to each server femtocell. Fourthly, when receiving a handover report from user equipment to switch from an original femtocell to a target femtocell, obtaining the registration information of the target femtocell from one server femtocell. Finally, transmitting a control signal including the obtained registration information to the user equipment.

10 Claims, 3 Drawing Sheets

HANDOVER CONTROL SYSTEM AND HANDOVER CONTROL METHOD FOR FEMTOCELLS

BACKGROUND

1. Technical Field

The present disclosure relates to femtocells, and more specifically, to a handover control system and a handover control method for femtocells.

2. Description of Related Art

A femtocell is a small, low-power cellular base station, which is used to improve network coverage within a small area, for example in home and small offices, thus allowing service providers to extend service coverage indoors.

When user equipment (UE) is moved from a region covered by a first femtocell to another region covered by a second femtocell, the user equipment transmits a handover request to a core network via the first femtocell. The core network determines the location of the second femtocell based on the handover request, and transmits the handover request to the second femtocell. The second femtocell then transmits a response to the core network, and the core network determines whether the user equipment is allowed to be connected to the second femtocell according to the response. If the user equipment is allowed to be connected to the second femtocell, the core network transmits a control signal to the first femtocell, and the first femtocell transmits the control signal to the user equipment. Thus, the user equipment is connected to the second femtocell.

With the known configuration, the core network needs to process a great amount of data, therefore making it easy for the core network to break down. Thus, there is room for improvement in the art.

BRIEF DESCRIPTION OF THE DRAWINGS

Many aspects of the present disclosure should be better understood with reference to the following drawings. The emphasis is placed upon clearly illustrating the principles of the present disclosure.

DETAILED DESCRIPTION

Figure 1:
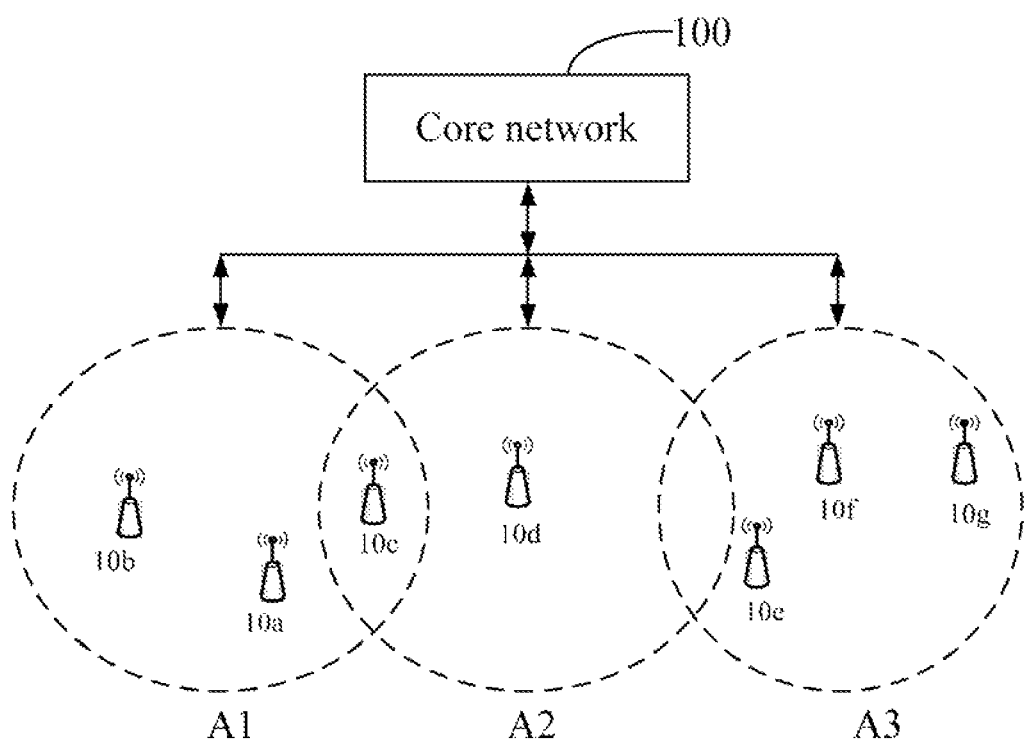
FIG. 1 is a schematic view showing an applied environment of a handover control system, in accordance with an exemplary embodiment.

FIG. 1 shows each region has a number of femtocells. The femtocells are used for connecting user equipment (e.g., smart phones) in the region to a core network 100. For example, the region A1 has three femtocells 10a, 10b, and 10c, the region A2 has two femtocells 10c and 10d, and the region A3 has three femtocells 10e, 10f, and 10g. In this embodiment, the core network 100 selects one or more femtocells from each region as server femtocells (the remaining femtocells not selected in each region are non-server femtocells), and assigns the server femtocell to process handover control received from user equipment. Thus, the core network 100 does not need to process a great amount of data, accordingly, the burden of the core network 100 decreases.

Figure 2:
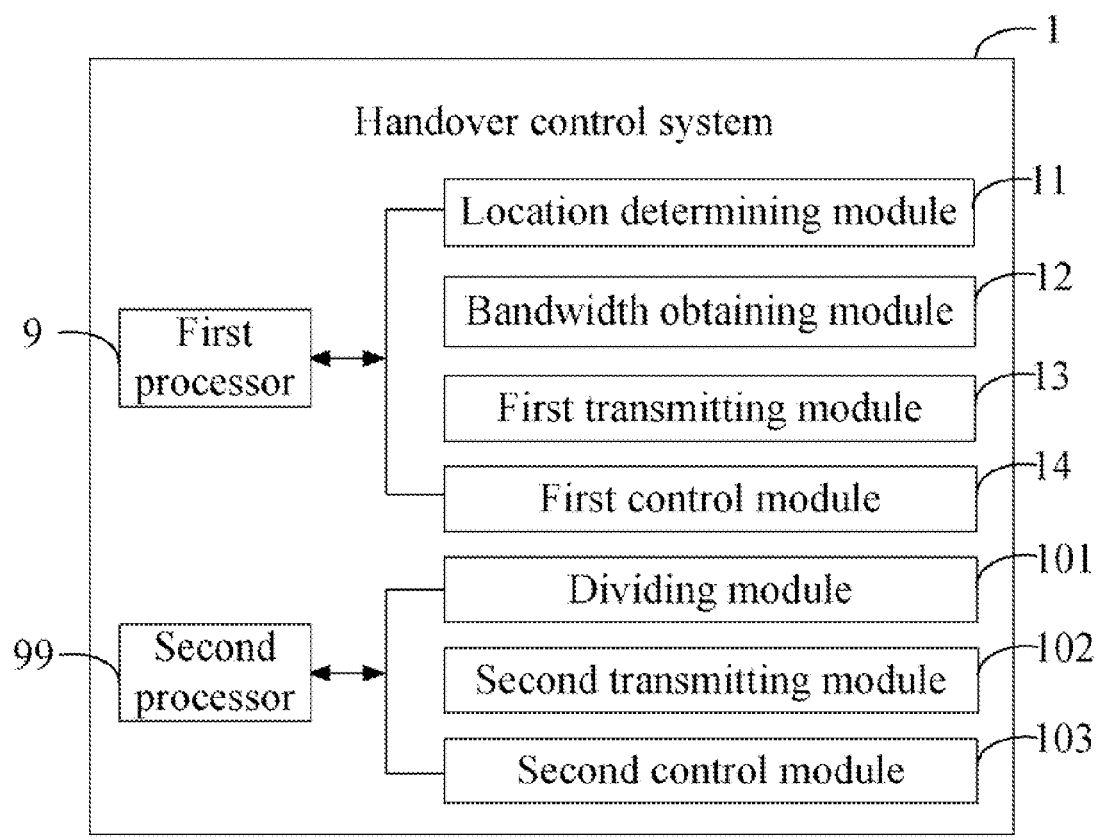
FIG. 2 is a block diagram of the handover control system of FIG. 1, in accordance with an exemplary embodiment.

FIG. 2 shows a handover control system 1 employed to process handover among femtocells. The system 1 includes a number of modules, a part of the modules is executed by a first processor 9 of each femtocell, and the remaining part of the modules is executed by a second processor 99 of the core network 100. In this embodiment, the system 1 includes a location determining module 11, a bandwidth obtaining module 12, a first transmitting module 13, a first control module 14, a dividing module 101, a second transmitting module 102, and a second control module 103. The location determining module 11, the bandwidth obtaining module 12, the first transmitting module 13, and the first control module 14 are executed by the first processor 9 of each femtocell. The dividing module 101, the second transmitting module 102, and the second control module 103 are executed by the second processor 99 of the core network 100.

The location determining module 11 determines the geographical location of the femtocell. In the embodiment, the location determining module 11 is a Global Positioning System (GPS) or an Assisted Global Positioning System (AGPS).

The bandwidth determining module 12 determines the maximum bandwidth provided by the femtocell.

The first control module 14 controls the first transmitting module 13 to transmit the geographical location and the maximum bandwidth of the femtocell to the core network 100.

The dividing module 101 determines which femtocells are in a same region according to the geographical information of each femtocell, and selects one or more femtocells from one region as server femtocells by comparing the maximum bandwidth of the femtocells in the same region. In this embodiment, the femtocell in one region having a greatest maximum bandwidth is selected as the server femtocell of the region. If the maximum bandwidth of two or more femtocells in one region are the same and are greatest, the two or more femtocells are selected as the server femtocells of the region. For example, if the maximum bandwidth of the femtocell 10a is greater than the maximum bandwidth of the femtocells 10b and 10c in the region A1, the femtocell 10a is selected as the server femtocell of the region A1.

The second control module 103 controls the second transmitting module 102 to transmit identification information of each femtocell to the non-server femtocells near the server femtocell, thereby allowing each non-server femtocell to determine its near server femtocell according to the received identification information. In the embodiment, if there is only one server femtocell in one region, the second control module 103 controls the second transmitting module 102 to directly transmit the identification information of the femtocell to all non-server femtocells in the region. If there are two or more server femtocells in one region, the second control module 103 further determines that each server femtocell of each region is near to which non-server femtocells in the region according to the geographical location of the femtocells. In addition, controls the second transmitting module 102 to transmit the identification information of each server femtocell to the non-server femtocells near the server femtocell. The second control module 103 further controls the second transmitting module 102 to transmit registration information of all the other femtocells of all regions to each server femtocell. In the embodiment, the identification information of one server femtocell is the Closed Subscriber Group Identification (CSG ID) of the server femtocell. The registration information of one femtocell is the connection information of the femtocell, such as an IP address for example. The user equipment can be connected to one femtocell according to its registration information.

When the user equipment requires switching from one femtocell (hereinafter original femtocell) to a target femtocell, the first control module 14 of the original femtocell receives a handover report from the user equipment. If the original femtocell is a server femtocell, the first control module 14 directly obtains the registration information of the target femtocell from the original femtocell. If the original femtocell is a non-server femtocell, the first control module 14 determines which server femtocell is near the original femtocell according to the identification information stored in the original femtocell, and controls the first transmitting module 13 to transmit a request to the determined server femtocell for obtaining the registration information of the target femtocell. After obtaining the registration information of the target femtocell from the determined server femtocell, the first control module 14 further controls the first transmitting module 13 to transmit a control signal including the obtained registration information to the user equipment. Then, the user equipment can establish a connection with the target femtocell according to the registration information of the target femtocell, and switch from the original femtocell to the target femtocell.

With the above configuration, the core network 100 does not need to process a great amount of data when user equipment requires switching from one femtocell to another femtocell.

Figure 3:
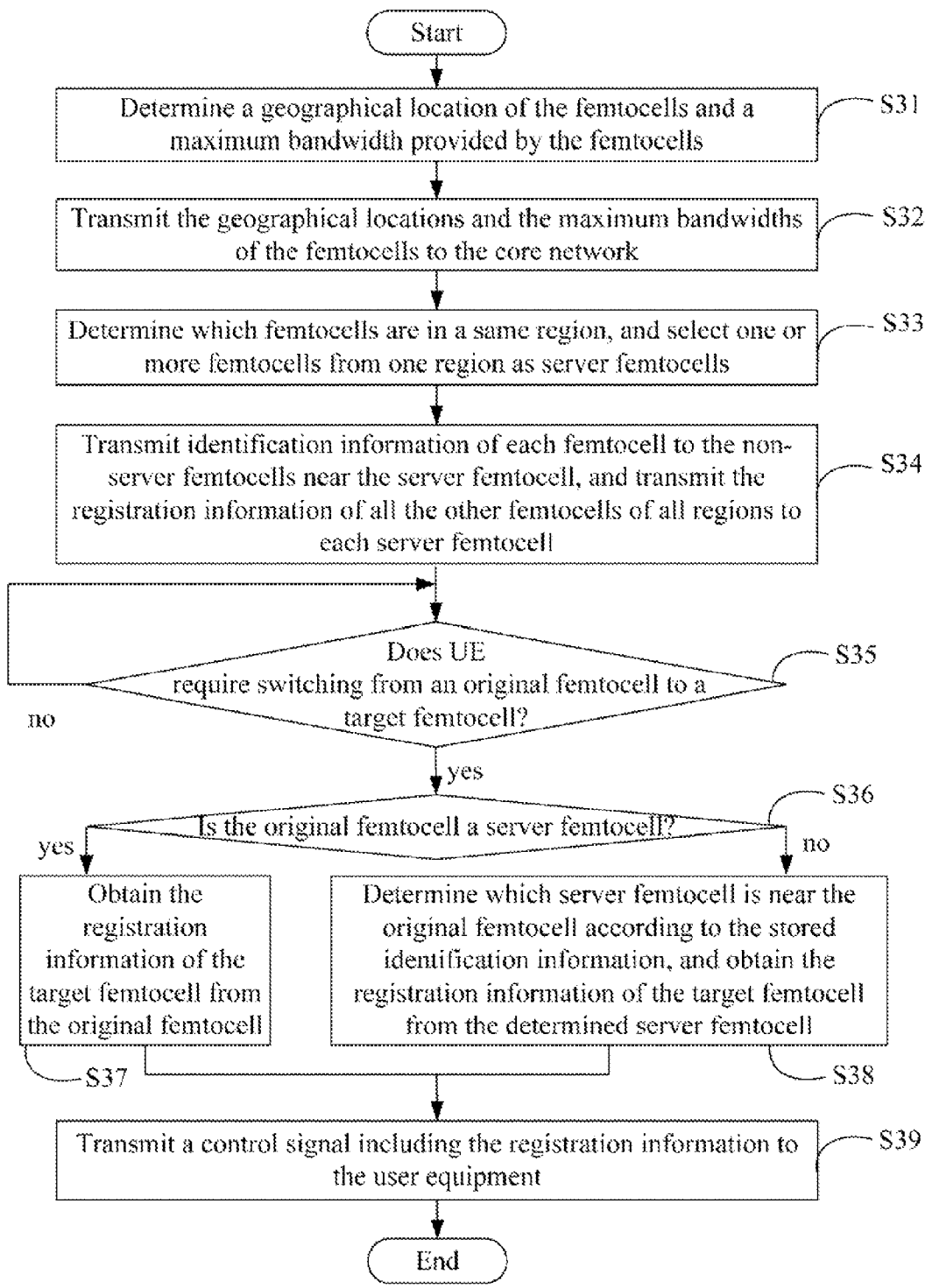
FIG. 3 is a flowchart of a handover control method, in accordance with an exemplary embodiment.

FIG. 3 is a flowchart of a handover control method for the femtocells, in accordance with an exemplary embodiment.

In step S31, the location determining module 11 determines the geographical location of the femtocell, and the bandwidth obtaining module 12 determines the maximum bandwidth provided by the femtocell.

In step S32, the first control module 14 controls the first transmitting module 13 to transmit the geographical location and the maximum bandwidth of the femtocell to the core network 100.

In step S33, the dividing module 101 determines which femtocells are in a same region according to the geographical information of each femtocell, and selects one or more femtocells from one region as server femtocells by comparing the maximum bandwidth of the femtocells in the same region.

In step S34, the second control module 103 controls the second transmitting module 102 to transmit identification information of each femtocell to the non-server femtocells near the server femtocell, and transmit the registration information of all the other femtocells of all regions to each server femtocell.

In step S35, the first control module 14 determines whether the user equipment has transmitted a handover repot to switch from the original femtocell to a target femtocell. If yes, the procedure goes to step S36; otherwise, the procedure goes back to step S35.

In step S36, the first control module 14 determines whether the original femtocell is a server femtocell, if yes, the procedure goes to step S37; otherwise, the procedure goes to step S38.

In step S37, the first control module 14 directly obtains the registration information of the target femtocell from the original femtocell.

In step S38, the first control module 14 determines which server femtocell is near the original femtocell according to the identification information stored in the original femtocell, and obtains the registration information of the target femtocell from the determined server femtocell.

In step S39, the first control module 14 controls the first transmitting module 13 to transmit a control signal including the obtained registration information to the user equipment. Then, the user equipment can establish a connection with the target femtocell according to the registration information of the target femtocell, and switch from the original femtocell to the target femtocell.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments.

What is claimed is:

1. A handover control system for processing handover among femtocells connected to a core network, the handover control system comprising:
   a plurality of first processors each comprised in a femtocell;
   a second processor comprised in the core network; and
   a plurality of modules executed by the first processors and the second processor to perform operations of processing handover among the femtocells, the operations comprising:
   determining by each of the first processors a geographical location of each femtocell and a maximum bandwidth provided by each femtocell;
   determining by the second processor which femtocells are in a same region according to the geographical information of each femtocell;
   selecting by the second processor one or more femtocells from one region as server femtocells of the region by comparing the maximum bandwidth of the femtocells in the same region;
   transmitting by the second processor identification information of each server femtocell to non-server femtocells near the server femtocell, transmitting by the second processor registration information of all other femtocells of all regions to each server femtocell, wherein the registration information of one femtocell is the connection information of the femtocell;
   when receiving a handover report from user equipment to switch from an original femtocell to a target femtocell, obtaining by the first processor of the original femtocell the registration information of the target femtocell from the original femtocell if the original femtocell is a server femtocell, and obtaining by the first processor of the original femtocell the registration information of the target femtocell from the server femtocell near the original femtocell if the original femtocell is a non-server femtocell; and
   transmitting by the first processor of the original femtocell a control signal comprising the obtained registration information to the user equipment, thereby allowing the user equipment to switch from the original femtocell to the target femtocell according to the registration information of the target femtocell.

2. The handover control system of claim 1, wherein the femtocell in one region having a greatest maximum bandwidth is selected as the server femtocell of the region; if the maximum bandwidth of two or more femtocells in one region are the same and are greatest, the two or more femtocells are selected as the server femtocells of the region.

3. The handover control system of claim 1, wherein if there is only one server femtocell in one region, the identification information of the femtocell is transmitted to all non-server femtocells in the region; if there are two or more server femtocells in one region, each server femtocell of each region is near to which non-server femtocells in the region is determined according to the geographical location of the femtocells, and the identification information of each server femtocell is transmitted to the non-server femtocells near the server femtocell.

4. The handover control system of claim 3, wherein the identification information of one server femtocell is the Closed Subscriber Group Identification of the server femtocell.

5. The handover control system of claim 3, wherein the registration information of one femtocell is an IP address of the femtocell.

6. A handover control method for processing handover among femtocells, the method comprising:
- determining a geographical location of each femtocell and a maximum bandwidth provided by each femtocell;
- determining which femtocells are in a same region according to the geographical information of each femtocell;
- selecting one or more femtocells from one region as server femtocells of the region by comparing the maximum bandwidth of the femtocells in the same region, wherein the selected server femtocell receives registration information of all non-server femtocells of the same regions, wherein the registration information of one femtocell is the connection information of the femtocell;
- transmitting identification information of each server femtocell to non-server femtocells near the server femtocell;
- when receiving a handover report from user equipment to switch from an original femtocell to a target femtocell, obtaining the registration information of the target femtocell from the original femtocell if the original femtocell is a server femtocell, and obtaining the registration information of the target femtocell from the server femtocell near the original femtocell if the original femtocell is a non-server femtocell; and
- transmitting a control signal comprising the obtained registration information to the user equipment, thereby allowing the user equipment to switch from the original femtocell to the target femtocell according to the registration information of the target femtocell.

7. The handover control method of claim 6, wherein the selected server femtocells of one region is the femtocell having a greatest maximum bandwidth.

8. The handover control method of claim 6, wherein the step transmitting identification information of each server femtocell to non-server femtocells near the server femtocell further comprises:
- if there is only one server femtocell in one region, transmitting the identification information of the femtocell to all non-server femtocells in the region; and
- if there are two or more server femtocells in one region, determining each server femtocell of each region is near to which non-server femtocells in the region according to the geographical location of the femtocells, and transmitting the identification information of each server femtocell to the non-server femtocells near the server femtocell.

9. The handover control method of claim 6, wherein the identification information of one server femtocell is the Closed Subscriber Group Identification of the server femtocell.

10. The handover control method of claim 6, wherein the registration information of one femtocell is an IP address of the femtocell.

* * * * *